United States Patent
Mohapatra et al.

(10) Patent No.: US 11,157,683 B1
(45) Date of Patent: Oct. 26, 2021

(54) SYSTEM, METHOD, AND COMPUTER PROGRAM FOR A DIGITAL TRANSFORMATION FRAMEWORK

(71) Applicant: Amdocs Development Limited, Limassol (CY)

(72) Inventors: Dinesh Kumar Mohapatra, Pune (IN); Yogesh Maheswari, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/780,615

(22) Filed: Feb. 3, 2020

(51) Int. Cl.
*G06F 40/154* (2020.01)
*G06Q 10/06* (2012.01)
*G06Q 30/06* (2012.01)

(52) U.S. Cl.
CPC ......... *G06F 40/154* (2020.01); *G06Q 10/067* (2013.01); *G06Q 30/0625* (2013.01)

(58) Field of Classification Search
CPC . G06F 40/154; G06Q 30/0625; G06Q 10/067
See application file for complete search history.

(56) References Cited

U.S. PATENT DOCUMENTS

| | | | |
|---|---|---|---|
| 5,430,836 A | 7/1995 | Wolf et al. | |
| 6,996,800 B2 | 2/2006 | Lucassen et al. | |
| 7,814,142 B2 | 10/2010 | Mamou et al. | |
| 8,418,072 B1 | 4/2013 | Bauer et al. | |
| 2003/0067485 A1 | 4/2003 | Wong et al. | |
| 2005/0210125 A1* | 9/2005 | Li | H04L 67/2857 709/219 |
| 2006/0101386 A1* | 5/2006 | Gerken | G06F 8/51 717/106 |
| 2009/0083058 A1* | 3/2009 | Beringer | G06Q 10/067 705/348 |
| 2012/0159358 A1* | 6/2012 | Waher | G06F 9/451 715/762 |
| 2015/0381740 A1* | 12/2015 | Gwin | H04W 12/068 709/228 |
| 2018/0275973 A1 | 9/2018 | Sullivan et al. | |

FOREIGN PATENT DOCUMENTS

EP 1308841 A2 5/2003

OTHER PUBLICATIONS

Trygve, R., "MVC, Xerox Parc 1978-79," 3 pages, retrieved Jan. 23, 2020 from http://heim.ifi.uio.no/%7Etrygver/themes/mvc/mvc-index.html.

(Continued)

*Primary Examiner* — Pei Yong Weng
(74) *Attorney, Agent, or Firm* — Zilka-Kotab, P.C.

(57) ABSTRACT

As described herein, a system, method, and computer program are provided for a digital transformation framework. In use, a controller accesses a plurality of business models representing requirements for a digital transformation project. Responsive to a user request for a particular content, the controller selects one or more business models of the plurality of business models. Further, the controller renders information associated with the selected one or more business models for viewing by the user, based on a select digital style guide of a plurality of digital style guides determined to correspond to a platform used by the user.

10 Claims, 8 Drawing Sheets

(56) References Cited

OTHER PUBLICATIONS

Microsoft, "ASP.NET MVC Overview," Microsoft Docs, Feb. 27, 2013, 5 pages, retrieved from http://msdn.microsoft.com/en-US/library/dd381412(v=vs.108).aspx.

Bell, "Why website speed is critical to online retail success in 2015," CDNetworks, Feb. 19, 2015, 10 pages, retrieved from http://se.cdnetworks.com/cdnetworks/sg/en/news-and-events/Why-website-speed-is-critical-to-online-retail-success-in-2015.

Reenskaug, T., "Working with objects: The OOram Software Engineering Method," Taskon Work Environments, vol. 23, No. 05, Mar. 29, 1995, 497 pages.

\* cited by examiner

SYSTEM, METHOD, AND COMPUTER PROGRAM FOR A DIGITAL TRANSFORMATION FRAMEWORK

FIELD OF THE INVENTION

The present invention relates to digital transformation projects.

BACKGROUND

In general, digital transformation is the process of using digital technologies to create new, or modify existing, business processes, culture, and customer experiences to meet changing business and market requirements. This reimagining of business in the digital age is referred to as digital transformation. Digital transformations can turn out to be a combination of different conflicting requirements, which makes them complex. Not only does it involve reengineering of existing content but also it involves business system reengineering, which necessitates a coherent adaptation of existing models to coexist with the new platform.

Typically, any current off-the-shelf product will provide a unified solution where all aspects of business widgets are combined. As part of the product in a digital transformation solution, all 3 aspects, namely Controller, View and Models are integrated and merged together. It is therefore very difficult to selectively pick up part of the solution seamlessly and use it for development and seamless deployment. In a real-life business scenario, for example, ecommerce sites will consist of multi-sites (including multiple microsites) using different Digital Style Guides (DSG) on different platforms. It is not easy to seamlessly transform all heterogenous sites using off the shelf products or solutions.

There is thus a need for addressing these and/or other issues associated with the prior art.

SUMMARY

As described herein, a system, method, and computer program are provided for a digital transformation framework. In use, a controller accesses a plurality of business models representing requirements for a digital transformation project. Responsive to a user request for a particular content, the controller selects one or more business models of the plurality of business models. Further, the controller renders information associated with the selected one or more business models for viewing by the user, based on a select digital style guide of a plurality of digital style guides determined to correspond to a platform used by the user.

DETAILED DESCRIPTION

Figure 1:
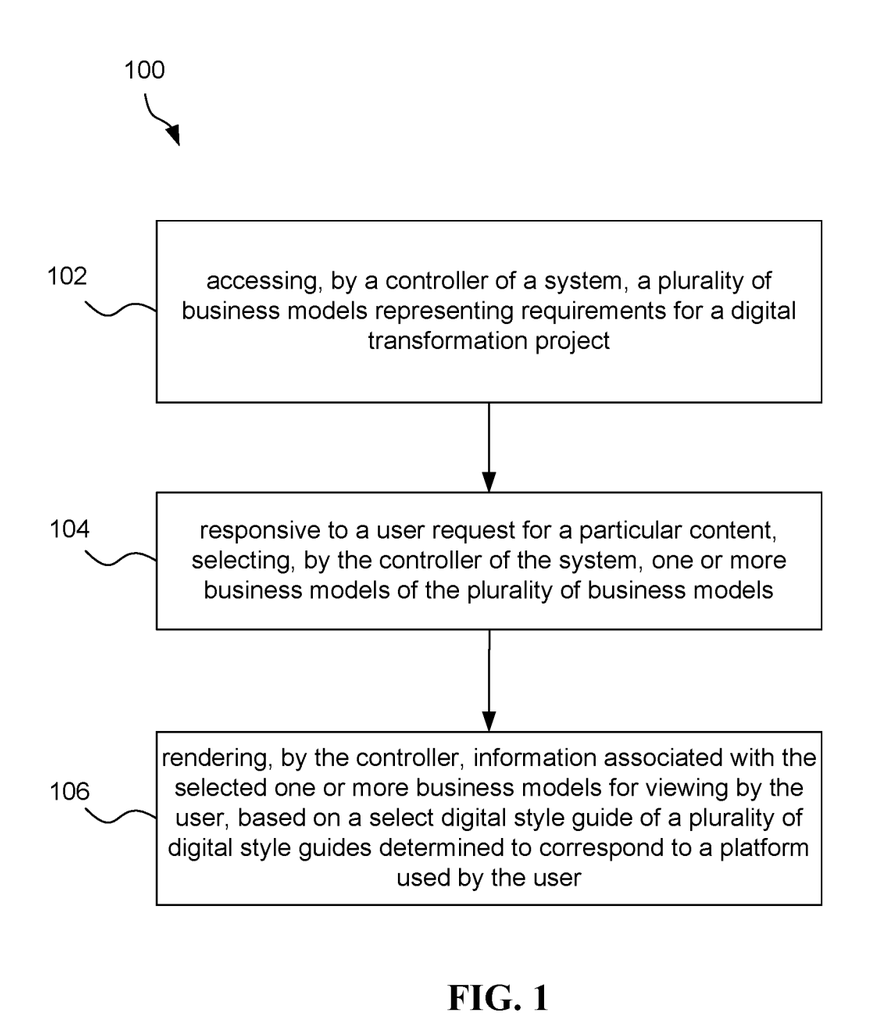
FIG. 1 illustrates a method for a digital transformation framework, in accordance with one embodiment.

FIG. 1 illustrates a method 100 for a digital transformation framework, in accordance with one embodiment. The digital transformation framework may be implemented in hardware (e.g. servers, processors, etc.), software (e.g. applications, modules, etc.), or any combination thereof for performing the method 100. In one embodiment, the digital transformation framework may be located in a network for use in association with content providers and content subscribers and/or users. For example, the digital transformation framework may be utilized by a telecommunications service provider for digital transformations associated with a platform of the telecommunications service provider.

As shown in operation 102, a controller accesses a plurality of business models representing requirements for a digital transformation project. In one embodiment, the plurality of business models may include static content models. For example, the static content models may each include content or managed content.

In another embodiment, the plurality of business models may include dynamic content models. For example, the dynamic content models may each include profile information for users.

Additionally, as shown in operation 104, responsive to a user request for a particular content, the controller selects one or more business models of the plurality of business models. In one embodiment, at least one of the selected business models may be a static content model of the static content models. For example, the selected static content model may have the particular content requested by the user.

In another embodiment, at least one of the selected business models may include a dynamic content model. For example, the selected dynamic content may have profile information for the user. Thus, the controller may select one or more static content models and/or one or more dynamic content models, based on logic of the controller and the request from the user.

Further, as shown in operation 106, the controller renders information associated with the selected one or more business models for viewing by the user, based on a select digital style guide of a plurality of digital style guides determined to correspond to a platform used by the user. In one embodiment, the controller may render the particular content requested by the user based on the selected business model(s) and the select digital style guide. In this way, the selected business model(s) and the select digital style guide may control a manner (e.g. style, format, etc.) in which the content is rendered for viewing by the user.

In one embodiment, the controller may be included in a component within which the information is rendered. For example, the component may be a webpage, widget, or other component. In another embodiment, the controller may include a translator that accesses the plurality of digital style guides to select the digital style guide to use render the information. For example, the select digital style guide may be predefined for a platform that has been determined as being used by the user.

In typical digital (e.g. eCommerce) transformations, thousands of web pages serving end users needs to be reengineered to provide seamless and uninterrupted business services to the users. At the same time that the web pages continue to serve the users, the ergonomics and experience needs to be consistent and self-explanatory. Thus, the digital transformation framework described above beneficially reuses existing Digital Style Guides (DSG) for the view layer to ensure consistent experience and to prevent risk associated with redevelopment of the views, which in turn enables faster developments with quick Time to Market (TTM).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
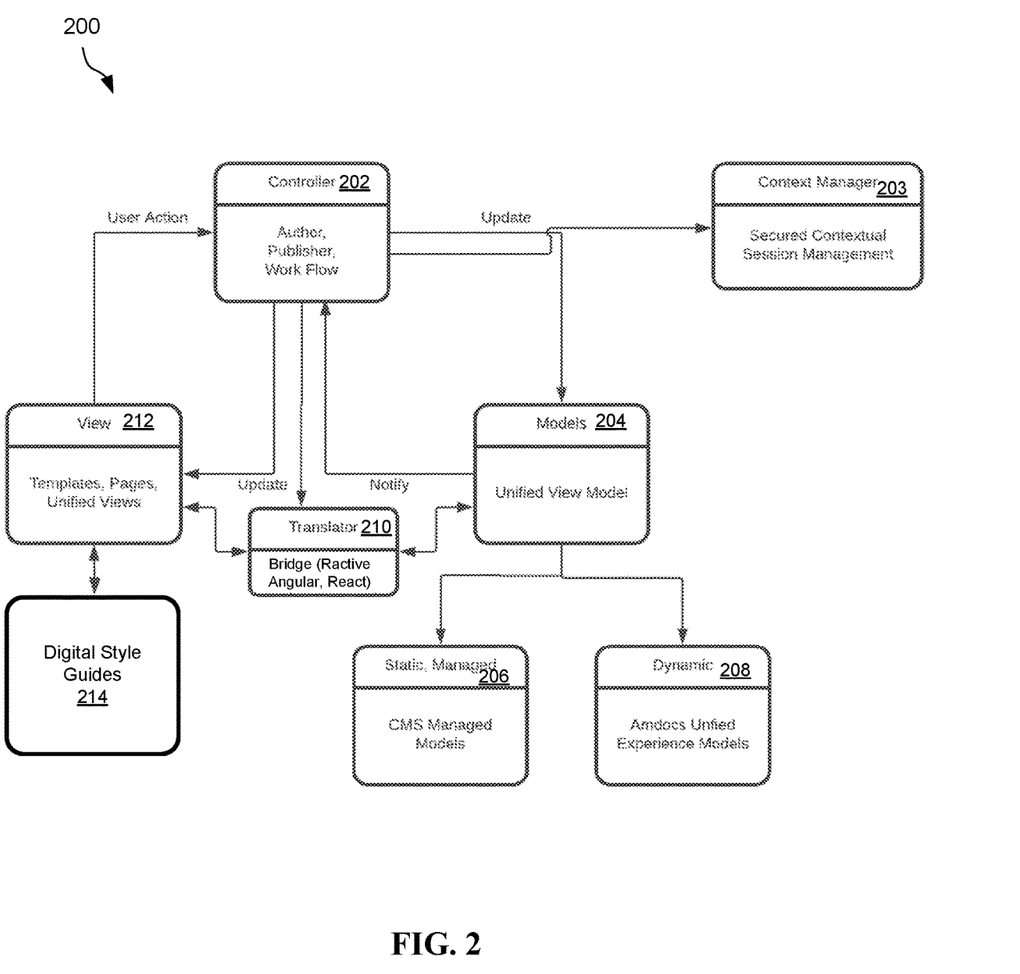
FIG. 2 illustrates a system flow diagram for a digital transformation framework, in accordance with one embodiment.

FIG. 2 illustrates a system flow diagram for a digital transformation framework 200, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, the digital transformation framework 200 includes a controller 202. The Controller configured to decide the appropriate model(s) 204 required for a particular user request, including a Static/Managed Content Model 206 associated with the user request and a Dynamic Model 208 corresponding to a user context and/or actions/events. The controller 202 then renders the information appropriately with the required view 212 based on a select Digital Style Guide (DSG) 214 that corresponds to the type of channel used by the user and touch points.

The Static/Managed Content Model 206 includes the Content (e.g. assets) managed by marketing and/or business entities. The Dynamic Content Model 208 includes information related to specific end users, such as profile information, billing information, pricing information, previously orders requested, etc.

The view 212 is a graphical user interface (GUI) for the end user experience which is managed via a Digital Style Guide (DSG) 214. Further, a translator 210 is embedded inside the controller 202 and acts during rendering and intercommunication between models 204 and views 212 to access a Digital Style Guide 214 and render the information seamlessly irrespective of the technology used by the user (e.g. Ractive, React or Angular JS, etc.). In this way, the framework 200 can enable a digital ecommerce transformation view 212 that is independent of the technology used (e.g. Ractive, React, Angular JS, etc.) and can enable reuse of existing legacy views as well. A Context Manager 203 maintains the context of the user session and enables the user to perform activities based on the end user session context (e.g. across devices, etc. while maintaining user validation).

This digital transformation framework 200 addresses the complexity of prior art technologies mentioned above by providing a uniform framework and development tool to manage multiple heterogeneous websites' Digital Style Guides (DSG) 214 to seamlessly interact with single/multi-model 204 interactions which will reduce significantly the development complexity. Firstly, the framework 200 configures the granular (micro) business objects to encapsulate information (data) to make business experience objects based on required business models 204. Secondly, all these business models 204 are controlled via the controller 202 of the specific pages/widgets/components and at the same time a translator 210 service is available to interact with the Digital Style Guides 214 to render the information with the specific view 212 to provide a coherent experience to the end user.

Figure 3:
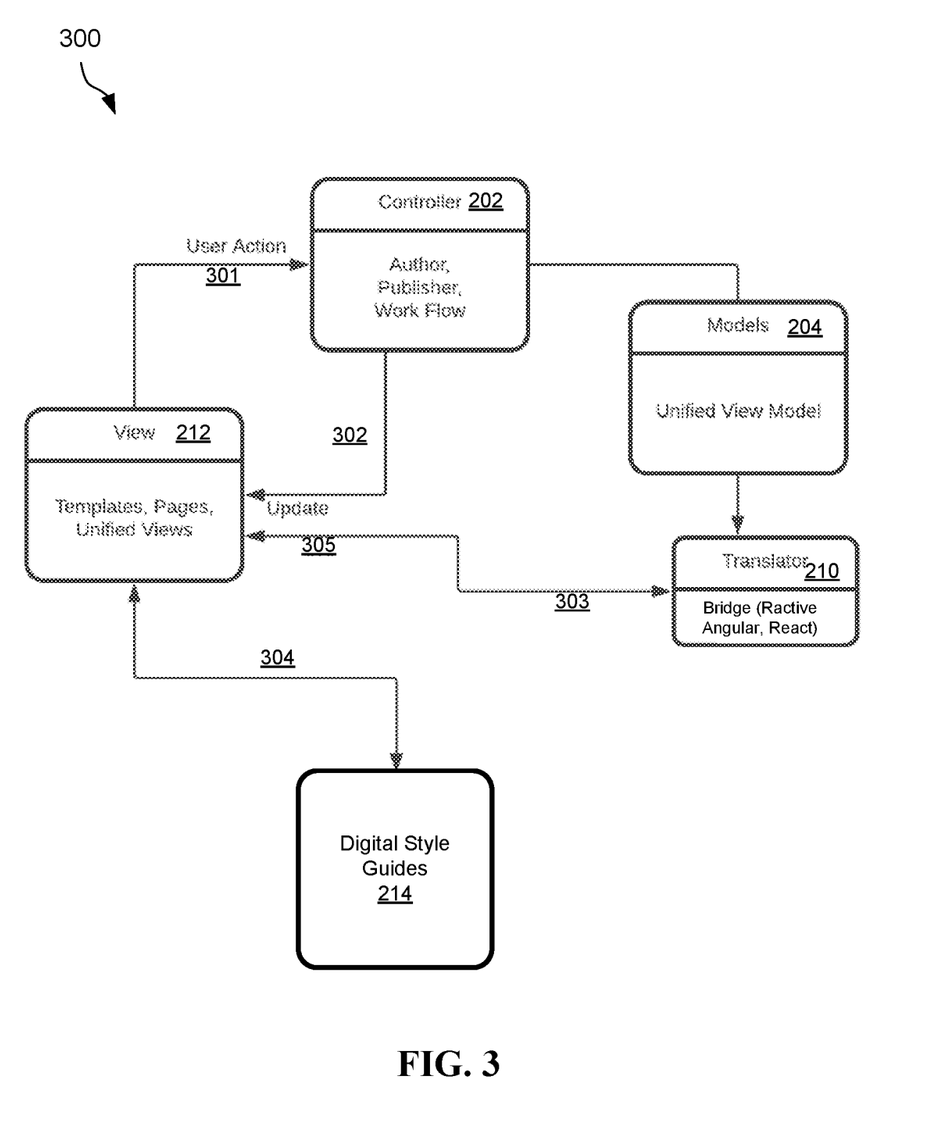
FIG. 3 illustrates a system flow diagram for a digital transformation framework managing a static content page, in accordance with one embodiment.

FIG. 3 illustrates a system flow diagram for a digital transformation framework 300 managing a static content page, in accordance with one embodiment. The digital transformation framework 300 of the present embodiment may be one implementation of the digital transformation framework 200 of FIG. 2, for example.

The present embodiment depicts a configuration process that can be used to manage a static content page flow. In operation 301, an eCommerce end User request is received to view 212 information in a portal (User Action). In operation 302, based on User Action, the controller 202 decides the required static model 206 and combines this information with the requested view 212 to send back the combined information as a response to the view 212.

In operation 303, based on the required View 212, the appropriate view javascript will be picked from the Digital Style Guide (DSG) 214. Depending on the type of javascript (Ractive, React, Angular JS, etc.), the translator 210 will provide a seamless service to translate it.

In operation 304, the appropriate view response from the translator 210 is received and with the information is rendered accordingly. In operation 305, the view 212 information in the form of HTML is available now for display to the user on the touch point screen which can be any browser, mobile application, etc.

Figure 4:
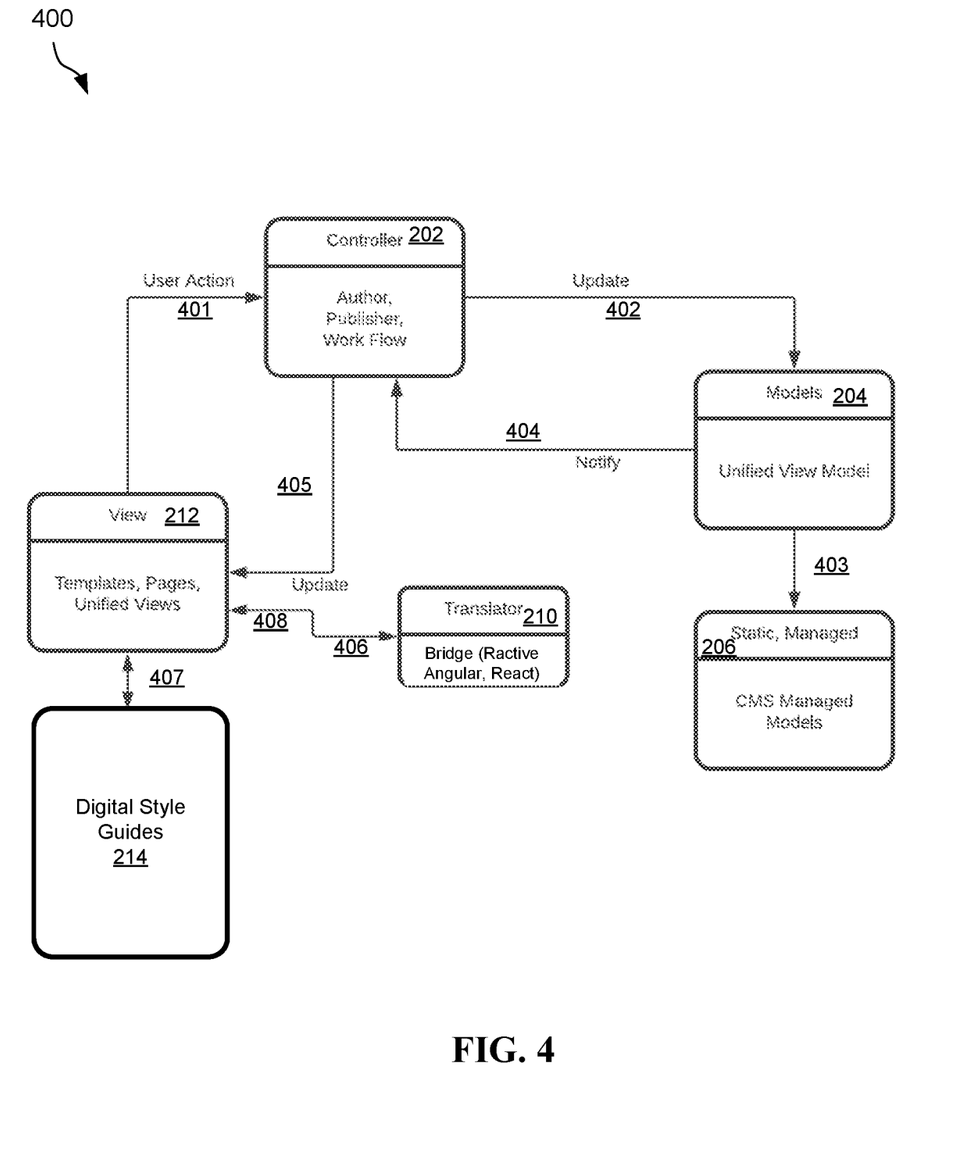
FIG. 4 illustrates a system flow diagram for a digital transformation framework managing a static managed content page, in accordance with one embodiment.

FIG. 4 illustrates a system flow diagram for a digital transformation framework 400 managing a static managed content page, in accordance with one embodiment. The digital transformation framework 400 of the present embodiment may be one implementation of the digital transformation framework 200 of FIG. 2, for example.

The present embodiment depicts a configuration process that can be used to manage a static managed content page flow. In operation 401, an eCommerce end User request is received to view 212 information in a portal (User Action). In operation 402, based on User Action, the controller 202 decides the required static model 206. In operation 403, based on the User Action and depending on any digital assets (content) needed, the required managed content information is made available from the model 204 for the rendering.

In operation 404, the controller 202 combines the static and managed content information from the model 204 and passes this information with the requested view 212. In operation 405, based on the required View 212, the appropriate view javascript will be picked from the Digital Style Guide (DSG) 214. Depending on the type of javascript (Ractive, React, Angular JS, etc.), the translator 210 will provide a seamless service to translate it.

In operation 406, the appropriate view response from the translator 210 is received and with the information is rendered accordingly. In operation 407, the view 212 information in the form of HTML is available now for display to the user on the touch point screen which can be any browser, mobile application, etc. In operation 408, based on ongoing user actions and depending on the type of content information/view required, the steps will be played by the controller 202 and as required the translator 210 will translate to provide the user a seamless view.

Figure 5:
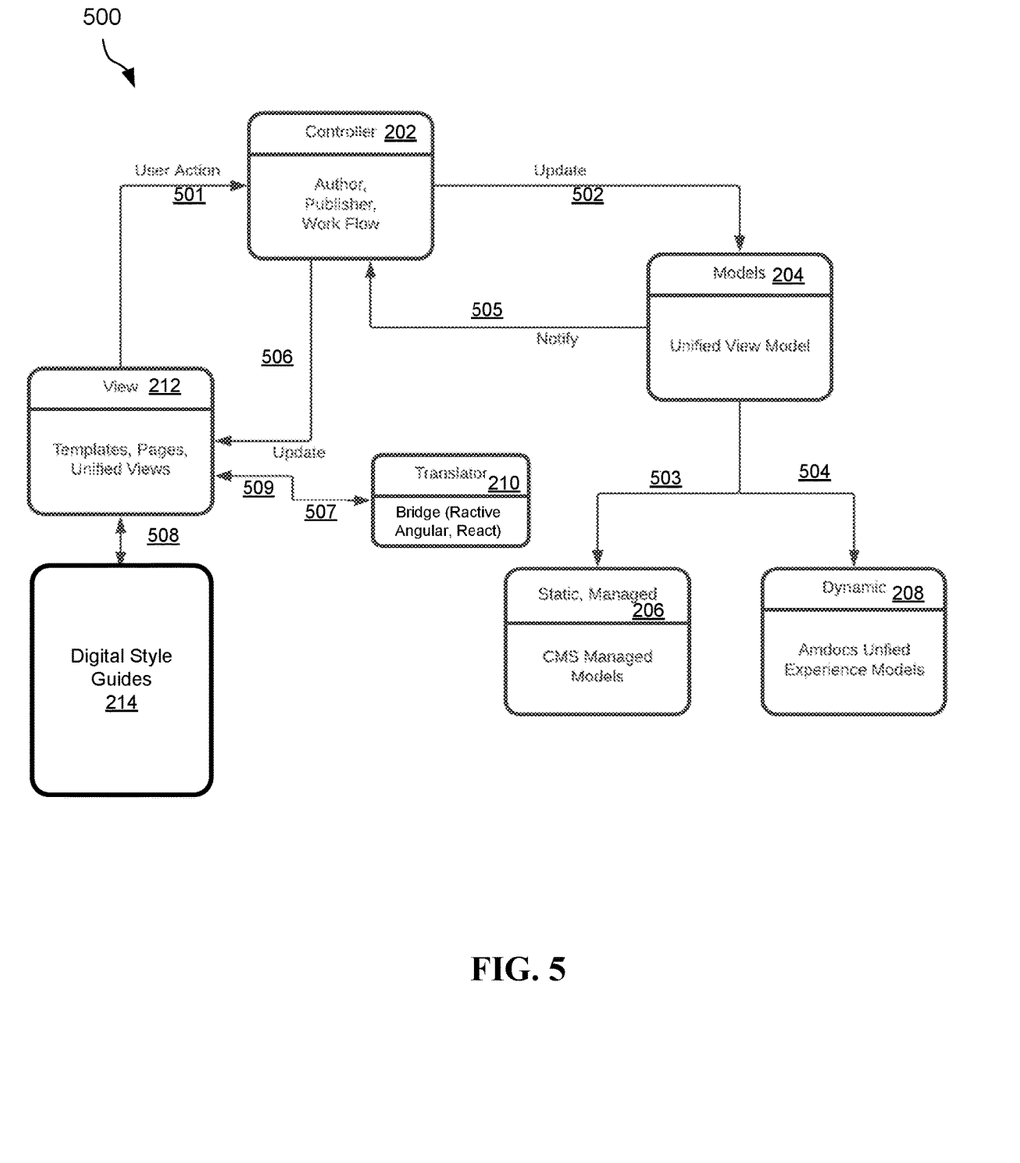
FIG. 5 illustrates a system flow diagram for a digital transformation framework managing a dynamic managed content page, in accordance with one embodiment.

FIG. 5 illustrates a system flow diagram for a digital transformation framework 500 managing a dynamic managed content page, in accordance with one embodiment. The digital transformation framework 500 of the present embodiment may be one implementation of the digital transformation framework 200 of FIG. 2, for example.

The present embodiment depicts a configuration process that can be used to manage a dynamic content page flow. In operation 501, an eCommerce end User request is received to view 212 information in a portal (User Action). In operation 502, based on User Action, the controller 202 decides the required static model 206. In operation 503, based on the User Action and depending on any digital assets (content) needed, the required managed content information is made available from the model 204 for the rendering.

In operation 504, based on the user action and depending on any dynamic content needed, the required dynamic content information will be available from the business support system/operational support system (BSS/OSS) via a dynamic business experience model 208 for rendering.

In operation 505, the controller 202 combines the static, managed and dynamic content information from the model 204 and passes this information with the requested view 212. In operation 506, based on the required view 212, the appropriate view javascript will be picked from the Digital Style Guide (DSG) 214. Depending on the type of javascript (Ractive, React, Angular JS, etc.), the translator 210 will provide a seamless service to translate it.

In operation 507, the appropriate view response from the translator 210 is received and with the information is rendered accordingly. In operation 508, the view 212 information in the form of HTML is available now for display to the user on the touch point screen which can be any browser, mobile application, etc. In operation 509, based on ongoing user actions and depending on the type of content information/view required, the steps will be played by the controller 202 and as required the translator 210 will translate to provide the user a seamless view.

Figure 6:
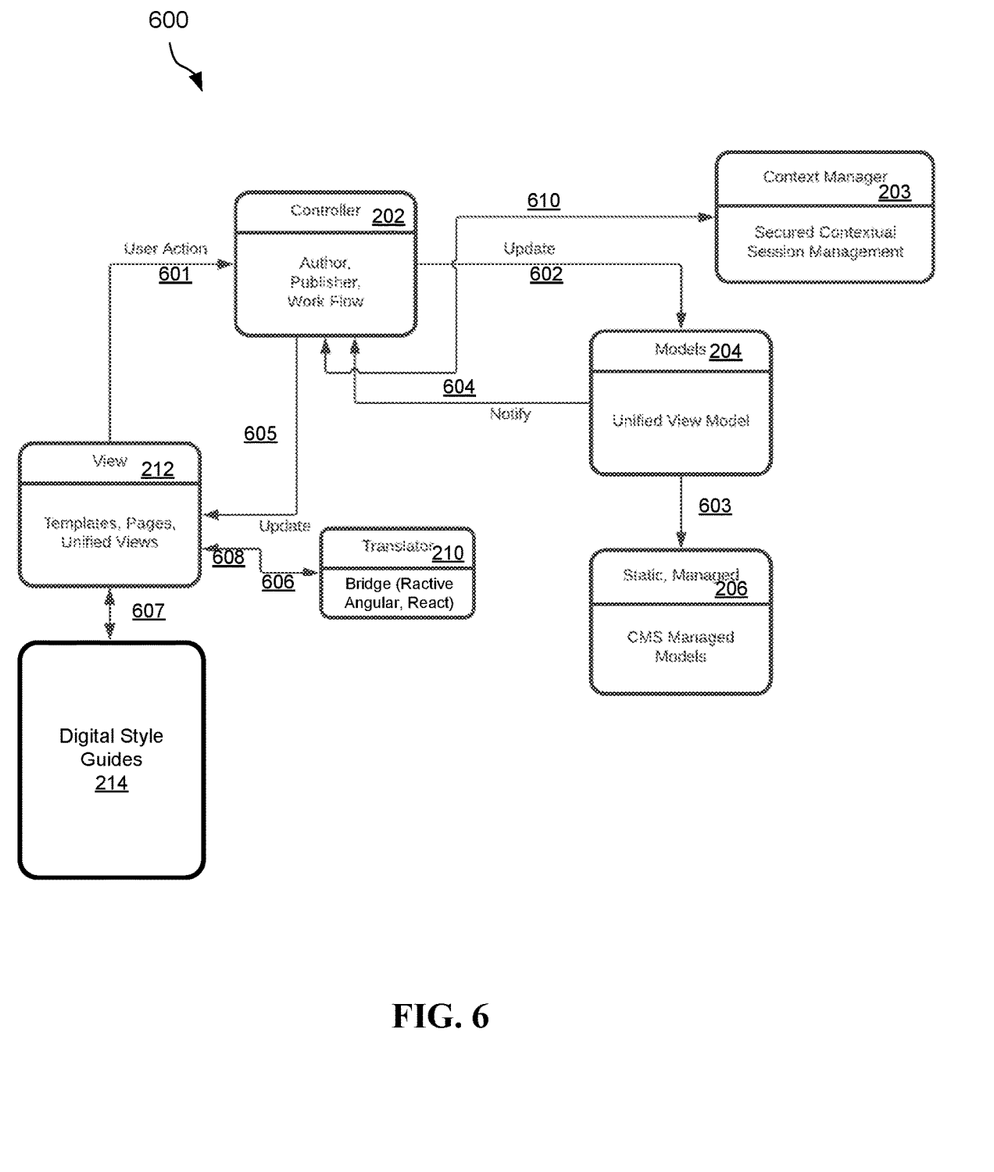
FIG. 6 illustrates a system flow diagram for a digital transformation framework managing a multi-site multi-context managed content page, in accordance with one embodiment.

FIG. 6 illustrates a system flow diagram for a digital transformation framework 600 managing a multi-site multi-context managed content page, in accordance with one embodiment. The digital transformation framework 600 of the present embodiment may be one implementation of the digital transformation framework 200 of FIG. 2, for example.

The present embodiment depicts a configuration process that can be used to manage a multi-site multi context manage content page flow. In operation 601, an eCommerce end User request is received to view 212 information in a portal (User Action). In operation 602, based on User Action, the controller 202 decides the required static model 206. In operation 603, based on the User Action and depending on any digital assets (content) needed, the required managed content information is made available from the model 204 for the rendering.

In operation 604, the controller 202 combines the static and managed content information from the model 204 and passes this information with the requested view 212. In operation 605, based on the required view 212, the appropriate view javascript will be picked from the Digital Style Guide (DSG) 214. Depending on the type of javascript (Ractive, React, Angular JS, etc.), the translator 210 will provide a seamless service to translate it.

In operation 606, the appropriate view response from the translator 210 is received and with the information is rendered accordingly. In operation 607, the view 212 information in the form of HTML is available now for display to the user on the touch point screen which can be any browser, mobile application, etc. In operation 608, based on ongoing user actions and depending on the type of content information/view required, the steps will be played by the controller 202 and as required the translator 210 will translate to provide the user a seamless view. In operation 610, based on User session Context, the controller 202 will interact with the context session manager 203 to retrieve appropriate models relevant for that session context and send information accordingly to render the view 212 for the user seamlessly.

Figure 7:
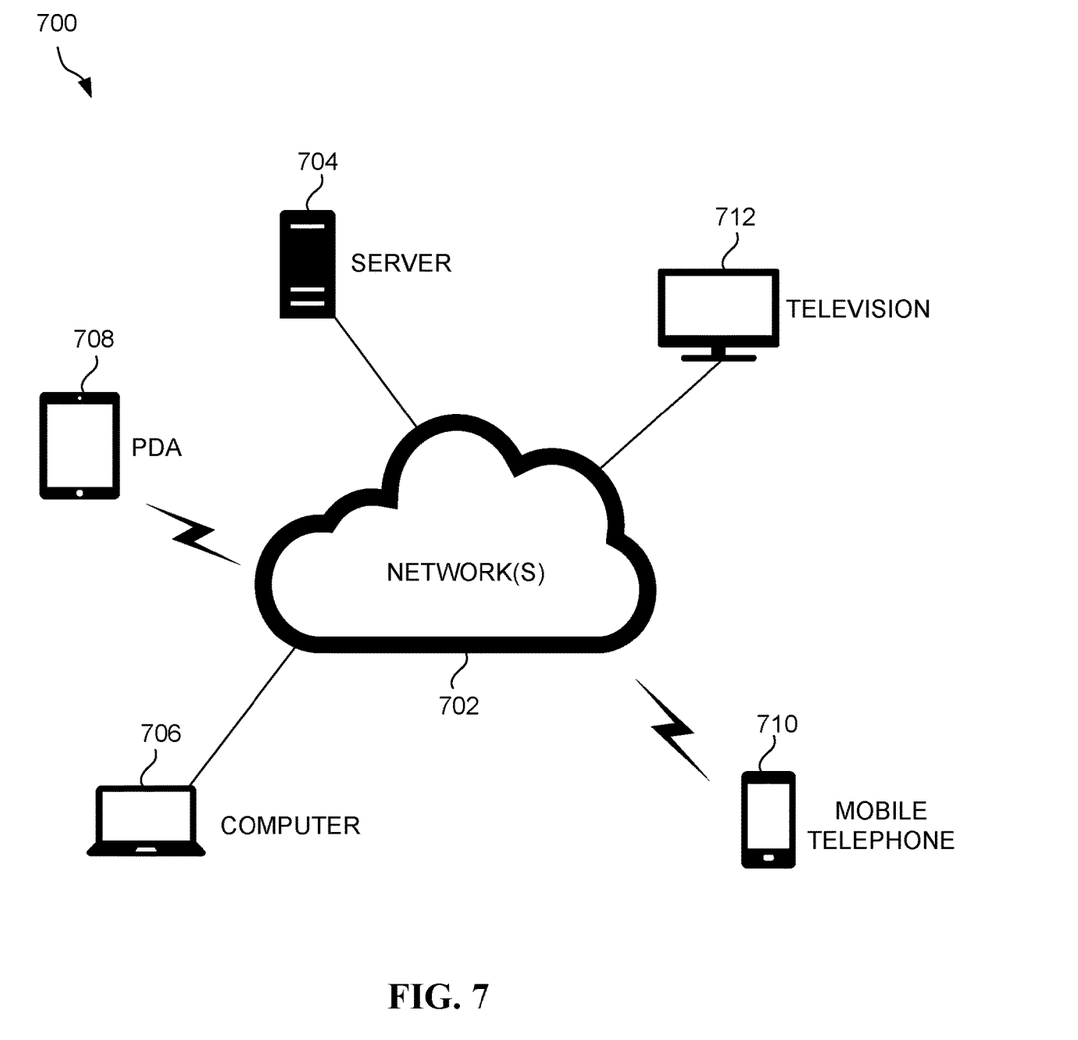
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
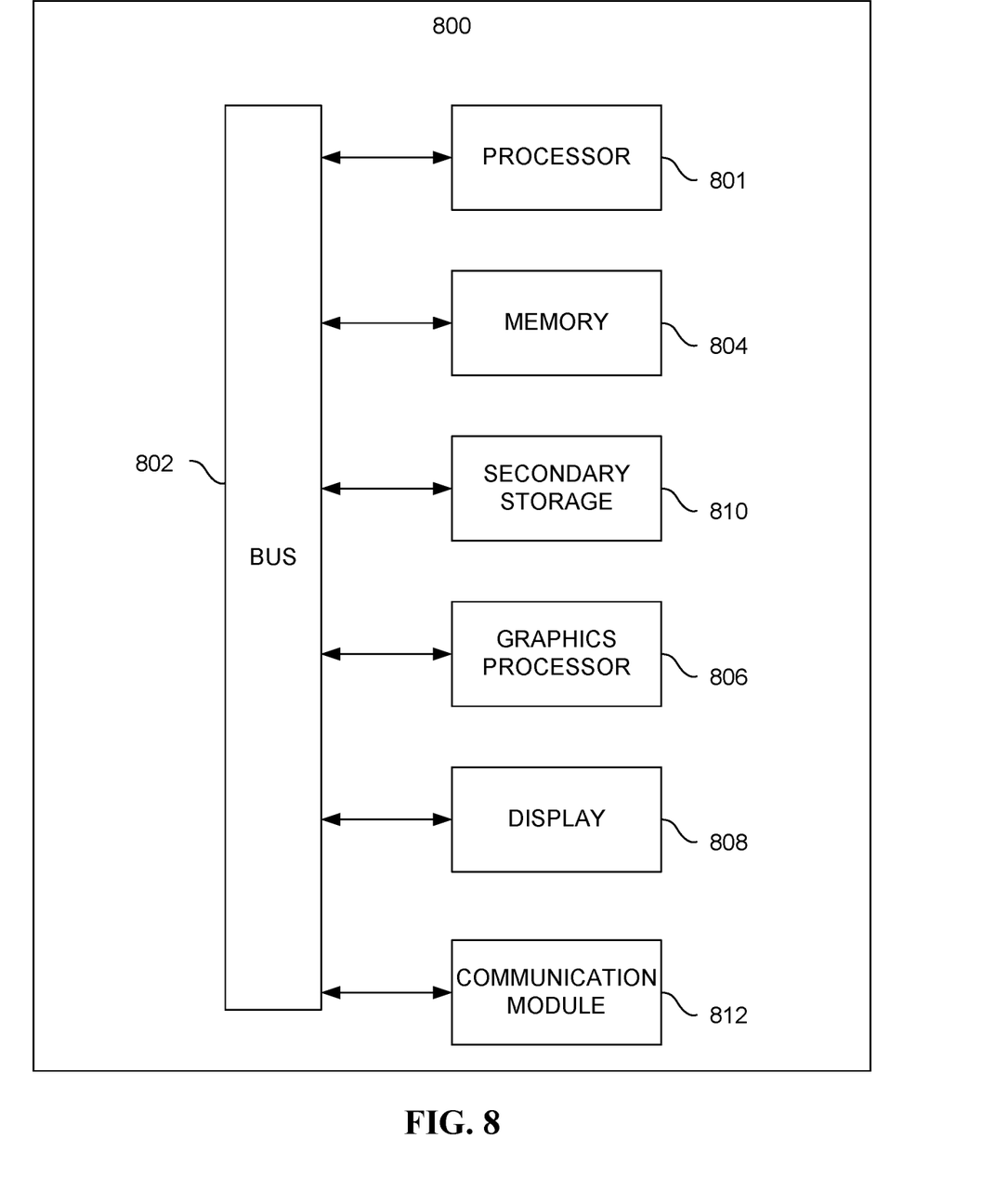
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   accessing, by a controller existing within a webpage of a system, a plurality of business models representing requirements for a digital transformation project, the plurality of business models including:
   a plurality of content models including different content, and
   a plurality of dynamic models including information related to different users;

responsive to a request from a user for a view of a particular content, selecting, by the controller existing within the webpage of the system
- a content model of the plurality of content models having the particular content requested by the user, and
- a dynamic model of the plurality of dynamic models having information related to the user;

combining, by the controller existing within the webpage of the system, the selected content model and the selected dynamic model to form combined information;

passing to a translator existing within the webpage of the system, by the controller existing within the webpage of the system, the combined information and the view requested by the user to cause the translator to:
- select a digital style guide of a plurality of digital style guides, based on the view requested by the user, wherein the selected digital style guide is predefined for a platform being used by the user, and
- translate the combined information according to the selected digital style guide to generate a view response;

receiving from the translator, by the controller existing within the webpage of the system, the view response;

based on the view response, rendering within the webpage, by the controller existing within the webpage of the system, the view having the particular content and the information related to the user for viewing by the user.

2. The non-transitory computer readable medium of claim 1, wherein the plurality of content models includes static content models.

3. The non-transitory computer readable medium of claim 1, wherein the information related to different users includes profile information for the different users.

4. A method, comprising:

accessing, by a controller existing within a webpage of a system, a plurality of business models representing requirements for a digital transformation project, the plurality of business models including:
- a plurality of content models including different content, and
- a plurality of dynamic models including information related to different users;

responsive to a request from a user for a view of a particular content, selecting, by the controller existing within the webpage of the system
- a content model of the plurality of content models having the particular content requested by the user, and
- a dynamic model of the plurality of dynamic models having information related to the user;

combining, by the controller existing within the webpage of the system, the selected content model and the selected dynamic model to form combined information;

passing to a translator existing within the webpage of the system, by the controller existing within the webpage of the system, the combined information and the view requested by the user to cause the translator to:
- select a digital style guide of a plurality of digital style guides, based on the view requested by the user, wherein the selected digital style guide is predefined for a platform being used by the user, and
- translate the combined information according to the selected digital style guide to generate a view response;

receiving from the translator, by the controller existing within the webpage of the system, the view response;

based on the view response, rendering within the webpage, by the controller existing within the webpage of the system, the view having the particular content and the information related to the user for viewing by the user.

5. The method of claim 4, wherein the plurality of content models includes static content models.

6. The method of claim 4, wherein the information related to different users includes profile information for the different users.

7. A system, comprising:

a non-transitory memory storing instructions; and one or more processors in communication with the non-transitory memory that execute the instructions to perform a method comprising:

accessing, by a controller existing within a webpage of the system, a plurality of business models representing requirements for a digital transformation project, the plurality of business models including:
- a plurality of content models including different content, and
- a plurality of dynamic models including information related to different users;

responsive to a request from a user for a view of a particular content, selecting, by the controller existing within the webpage of the system
- a content model of the plurality of content models having the particular content requested by the user, and
- a dynamic model of the plurality of dynamic models having information related to the user;

combining, by the controller existing within the webpage of the system, the selected content model and the selected dynamic model to form combined information;

passing to a translator existing within the webpage of the system, by the controller existing within the webpage of the system, the combined information and the view requested by the user to cause the translator to:
- select a digital style guide of a plurality of digital style guides, based on the view requested by the user, wherein the selected digital style guide is predefined for a platform being used by the user, and
- translate the combined information according to the selected digital style guide to generate a view response;

receiving from the translator, by the controller existing within the webpage of the system, the view response;

based on the view response, rendering within the webpage, by the controller existing within the webpage of the system, the view having the particular content and the information related to the user for viewing by the user.

8. The non-transitory computer readable medium of claim 1, wherein the view is a graphical user interface (GUI).

9. The non-transitory computer readable medium of claim 1, further comprising:
- maintaining a context of a session associated with the user, and
- enabling the user to perform activities across devices using the context.

10. The non-transitory computer readable medium of claim 1, wherein the information related to the different users is provided by a business support system/operational support system (BSS/OSS) via the plurality of dynamic models.

\* \* \* \* \*